United States Patent [19]
Nishikiori et al.

[11] Patent Number: 6,018,511
[45] Date of Patent: Jan. 25, 2000

[54] MAGNETO-OPTICAL RECORDING MEDIUM AND READOUT METHOD OF THE SAME

[75] Inventors: Keiji Nishikiori, Daito; Kiyoshi Uchida, Yamatotakada; Motoyoshi Murakami; Masahiro Birukawa, both of Hirakata, all of Japan

[73] Assignee: Matsushita Electric Industrial Co., Ltd., Osaka, Japan

[21] Appl. No.: 08/918,431

[22] Filed: Aug. 26, 1997

[30] Foreign Application Priority Data

Aug. 27, 1996 [JP] Japan .................................. 8-224876

[51] Int. Cl.$^7$ ..................................................... G11B 7/00
[52] U.S. Cl. ........................... 369/275.2; 369/13; 369/110
[58] Field of Search ............................... 362/110, 13, 58, 362/59, 116, 54, 47, 48, 275.1, 275.2, 283

[56] References Cited

U.S. PATENT DOCUMENTS

| | | | |
|---|---|---|---|
| 5,428,586 | 6/1995 | Kobayashi et al. | 369/13 |
| 5,615,180 | 3/1997 | Mieda et al. | 369/13 |

FOREIGN PATENT DOCUMENTS

| | | |
|---|---|---|
| 0318925 | 6/1989 | European Pat. Off. |
| 0420112 | 4/1991 | European Pat. Off. |
| 0474505 | 3/1992 | European Pat. Off. |
| 0498461 | 8/1992 | European Pat. Off. |
| 0720161 | 7/1996 | European Pat. Off. |
| 19520627 | 1/1996 | Germany. |
| 5-81717 | 4/1993 | Japan. |
| 7141709 | 6/1995 | Japan. |

OTHER PUBLICATIONS

K. Nishikiori et al.; "Magnetically Induced Super–Resolution Without an External Magnetic Field," Journal of Magnetic Society of Japan, vol. 21, No. 4–2, pp. 321–324, 1997.

M. Ota et al.; "Development of Magnetic–Optical Disk Realizing Double or Higher Density Reproduction Using Existing Optical System," Nikkei Electronics, No. 539, pp. 223–233, Oct. 28, 1991.

Search Report Application No. 97114755.8–2210; Dated May 12, 1998.

Nakajima et al.; 1995 Digest of Intermag. International Magnetics Conference, San Antonio, Apr. 18–21, 1995, Apr. 18, 1995, Institute of Electrical and Electronics Engineers, "New Magnetically Induced Super Resolution Disk By Using Exchange—. . . ".

*Primary Examiner*—Muhammad Edun
*Attorney, Agent, or Firm*—Renner, Otto, Boisselle & Sklar P.L.L.

[57] ABSTRACT

A magneto-optical recording medium includes at least a readout magnetic film and a recording magnetic film on a substrate, wherein information is recorded onto the recording magnetic film through magnetization of the recording magnetic film thereby forming domains therein, by a heating caused by irradiation of a recording light and application of a recording magnetic field, and the recorded information is read out through irradiation of a readout light thereby copying magnetization of the domains in the recording magnetic film to the readout magnetic film. The recording magnetic film is a perpendicular magnetic film in which the formed domains are retained The readout magnetic film Is a perpendicular magnetic film having a magnetic characteristic in which domains formed therein shrink The readout magnetic film contains no domains formed therein at a timing except for a readout operation to have a unidirectional magnetization.

20 Claims, 10 Drawing Sheets

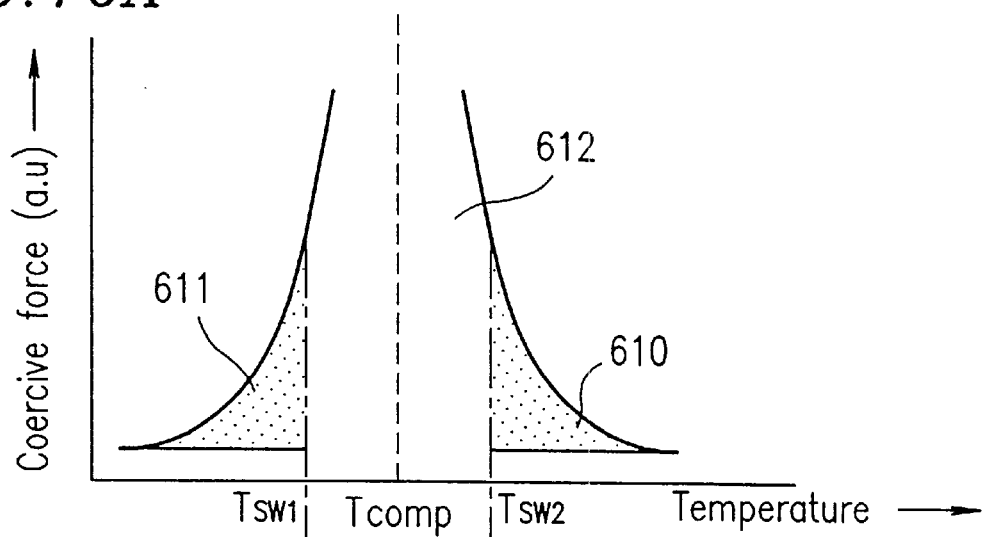
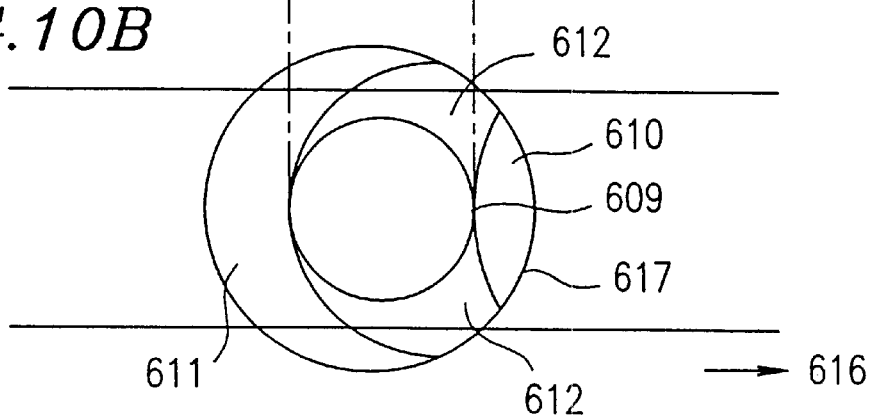

MAGNETO-OPTICAL RECORDING MEDIUM AND READOUT METHOD OF THE SAME

BACKGROUND OF THE INVENTION

1. Field of the Invention

The present invention relates to a magneto-optical recording medium for recording and erasing information thereon/therefrom by utilizing a rise in temperature upon the irradiation of laser beams and for reading out a recorded signal by utilizing magneto-optical effects, and also relates to a readout method of the same.

2. Description of the Related Art

In a magneto-optical recording method, a part of a magnetic film in a magneto-optical recording medium is locally heated to a Curie temperature or a compensation temperature or higher by irradiating laser beams thereto. The heated part is then magnetized to the direction of an external magnetic field, thereby forming domains.

A magnetic field modulation recording method is an exemplary magneto-optical recording method for such a magneto-optical recording medium In the magnetic field modulation recording method, the temperature of an overall recording magnetic film is increased by irradiating laser beams having a predetermined intensity thereto and a thermo-magnetical recording is performed onto a certain portion of the heated recording magnetic film by using an external magnetic field having a direction modulated in accordance with a signal to be recorded.

A light power modulation recording method is another exemplary magneto-optical recording method. In the light power modulation recording method, the temperature of a recording magnetic film is increased by irradiating laser beams having an intensity which has been modulated in accordance with a recording signal and simultaneously impressing an external magnetic field having a predetermined intensity, thereby performing a thermo-magnetical recording.

In a conventional magneto-optical recording medium, if the size of a domain becomes equal to or smaller than the diameter of a readout beam spot, the adjacent domains that are located prior to and posterior to the domain from which information is to be read out are also included unintentionally within the readout beam spot (i.e., the detection range). In such a case, the magnitude of a read out signal is reduced because of the interaction from these adjacent domains, the S/N ratio thereof is adversely decreased.

In order to 'solve such a problem, a magneto-optical recording method such as that shown in FIGS. 1A and 1B has been proposed (see Nikkei Electronics, No. 539, Oct. 28, 1991)A Hereinafter, such a magneto-optical recording method will be briefly described.

As shown in the cross-sectional view in FIG. 1B, a magneto-optical recording medium 60 is formed so as to include a readout magnetic film 63, a copy magnetic film 64A, an intermediate film 64, and a recording magnetic film 65, all of these films having been stacked in this order on a substrate (not shown). In FIG. 1B, the arrow X indicates the tangential direction of the magneto-optical recording medium 60 along the tracks thereof, an upward arrow 61 indicates the magnetic fields for recording and readout, and a downward arrow 62 indicates an initialization magnetic field.

On the other hand, FIG. 1A is a plan view showing a part of a track on the magneto-optical recording medium 60. As shown in this figure, when information. is read out, a readout beam spot 67 is formed by an irradiated laser beam along the track. When the laser beam is irradiated onto a rotating magneto-optical recording medium 60, the temperature distribution of the magnetic film structure including the readout magnetic film 63 and the copy magnetic film 64A is not in rotation symmetry with respect to the center of a circle formed by the readout beam spot 67. More specifically, a temperature area 70 which has already been irradiated with the readout beam spot 67 becomes a high temperature area 70, in which the temperature rises to the Curie temperature Tc of the copy magnetic film 64A or higher. A crescent part occupying the left area of the readout beam spot 67 outside of the high temperature area 70 will be called an "intermediate temperature area" 72, while the remaining internal part of the readout beam spot 67 on the right side of the intermediate temperature area 72 will be called a "low temperature area" 71.

Herein, it is assumed that signals (or information) have been recorded beforehand as domains 69 in the recording magnetic film 65 in a thermo-magnetical manner. The copy magnetic film 64A has been strongly exchange-coupled with the readout magnetic film 63. The intermediate film 64 is a film provided for stabilizing a domain wall when the magnetized direction of the readout magnetic film 63 is aligned with that of the recording magnetic film 65.

Hereinafter, the readout operation of the magneto-optical recording medium 60 having such a configuration will be described.

Initially, the magnetized direction of the readout magnetic film 63 is aligned with the direction of the initialization magnetic field 62. During readout, a laser beam for readout is irradiated onto the range from X1 to X2 shown in FIG. 1B onto the rotating magneto-optical recording medium 60 to form the readout beam spot 67. As a result, the temperature is increased and the temperature distribution shown in FIG. 1A (i.e., the respective temperature areas 70, 71, and 72 as described previously) is produced on the magneto-optical recording medium 60. In this case, since the coercive force of the readout magnetic film 63 is decreased because of the rise in temperature, the exchange-coupling with the recording magnetic film 65 becomes dominant in the intermediate temperature area 72 and the magnetized direction of the readout magnetic film 63 is aligned with the magnetized direction of the recording magnetic film 65.

Furthermore, in the high temperature area 70 having a temperature of Tc or higher, the magnetization of the copy magnetic film 64A becomes extinct. As a result, the exchange-coupling between the readout magnetic film 63 and the recording magnetic film 65 is cut off at the area corresponding to the extinct magnetization, and the magnetized direction of the readout magnetic film 63 is aligned in the direction of the readout magnetic field 61, Thus, both the low temperature area 71 inside the readout beam spot 67 and the high temperature area 70 mask their specific domains 69. Consequently, information can be read out as a read out signal from the domain 69X existing only in the intermediate temperature area 72.

In this manner, in accordance with the above-described method, even if a domain 69 is smaller than the readout beam spot 67, information can be read out at a high density without causing any interaction from the adjacent domains 69.

However, the above-described magneto-optical recording medium 60 has a problem in that the initialization magnetic field 62 is required for performing an initialization process for aligning the magnetized direction of the readout magnetic film 63 with the direction of the recording magnetic film 65.

In order to solve such a problem, a magneto-optical recording medium 80 such as that shown in FIGS. 2A and 2B has been proposed (see Japanese Laid-Open Patent Publication No. 5-81717).

The magneto-optical recording medium 80 includes a readout magnetic film 83 and a recording magnetic film 85 which have been formed on a substrate (not shown). in the cross-sectional view in FIG. 2B. In FIG. 2B, the arrow X indicates the tangential direction of the magneto-optical recording medium 80 along the tracks. In the magneto-optical recording medium 80, an in-plane anisotropic magnetic film is used as the readout magnetic film 83, unlike the magneto-optical recording medium 60 shown in FIGS. 1A and 1B.

FIG. 2A is a plan view showing a part of a track on the magneto-optical recording medium 80. As in the magneto-optical recording medium 60 described with reference to FIGS. 1A and 1B, when information is read out, a readout beam spot 87 is formed by irradiating a laser beam onto the range from X1 to X2 shown in FIG. 2B along the track.

When the laser beam. is irradiated onto the rotating magneto-optical recording medium 80, the temperature distribution of the readout magnetic film 83 and the recording magnetic film 85 is not in rotation symmetry with respect to the center of a circle formed by the readout beam spot 87. More specifically, an area which has already been irradiated with the readout beam spot 87 in addition to the left end area of the readout beam spot 87 forms a high temperature area 90. On the other hand, the remaining area of the readout beam spot 87 outside of the high temperature area 90 becomes a low temperature area 91. In this case, a domain 89 is also much smaller than the readout beam spot 87.

Hereinafter, the readout operation of the magneto-optical recording medium 80 having such a configuration will be described.

Herein, it is also assumed that recording signals have been recorded beforehand in each domain 89 of the recording magnetic film 85 In accordance with the thermo-magnetical recording method. The readout magnetic film 83 exhibits an in-plane anisotropy at room temperature, and is turned into a perpendicular magnetic film only in the high temperature area 90 inside the readout beam spot 87. When a readout laser beam is irradiated onto the range from X1 to X2 shown in FIG. 2B, the temperature is increased so that the high temperature area 90 and the low temperature area 91 are formed. In the high temperature area 90, the readout magnetic film 83 is changed into a perpendicular magnetic film and the magnetized direction thereof is aligned with the magnetized direction of the recording magnetic film 85 owing to the exchange-coupling. However, when the temperature is decreased as the magneto-optical recording medium 80 moves to the X direction, the readout magnetic film 83 is changed again into an in-plane anisotropic magnetic film.

In this way, in the magneto-optical recording medium 80, information can be read out from a domain 89 smaller than the readout beam spot 87 without using the initialization magnetic field.

However, though such a magneto-optical recording medium 80 using an in-plane anisotropic magnetic film as the readout magnetic film 83 can advantageously eliminate the initialization magnetic field, the magneto-optical recording medium 80 also has the following disadvantages.

First, the magnetization of the readout magnetic film 83 is attracted to the direction of the recording magnetic film 85 owing to the exchange-coupling between the readout magnetic film 83 and the recording magnetic film 85. As a result, an ideal in-plane anisotropy cannot be maintained and a vertical component of magnetization is produced. Consequently, a copy of the domains 89 is adversely caused in the areas where such a copy is unnecessary, and the resolution may be insufficient at the time of readout.

Second, since the critical temperature at which the readout magnetic film 83 is changed from an in-plane anisotropic magnetic film into a perpendicular magnetic film is constant, a variation in readout power of a readout laser beam varies the areas to which the domains 89 are copied. Consequently, an interaction of waveform of the readout signals is caused among the adjacent domains so that the readout characteristics are degraded.

SUMMARY OF THE INVENTION

According to one aspect of the present invention, a magneto-optical recording medium includes at least a readout magnetic film and a recording magnetic film on a substrate, wherein information is recorded onto the recording magnetic film through magnetization of the recording magnetic film thereby forming domains therein, by a heating caused by irradiation of a recording light and application of a recording magnetic field, and the recorded information is read out through irradiation of a readout light thereby copying magnetization of the domains in the recording magnetic film to the readout magnetic film. The recording magnetic film is a perpendicular magnetic film in which the formed domains are retained The readout magnetic film is a perpendicular magnetic film having a magnetic characteristic in which domains formed therein shrink. The readout magnetic film contains no domains formed therein at a timing except for a readout operation to have a unidirectional magnetization.

Each of the recording magnetic film and the readout magnetic film may be made of a rare earth metal—a transition metal amorphous material.

In one embodiment, the magneto-optical recording medium of the invention further includes an intermediate magnetic film, provided between the readout magnetic film and the recording magnetic film, for controlling exchange-coupling force therebetween.

The intermediate magnetic film may be made of a rare earth metal—a transition metal amorphous material.

In one embodiment, in a temperature area from room temperature (hereinafter, the symbol "Troom" is used in order to refer thereto) to a temperature Tsw1, a force which causes the domains in the readout magnetic film to become extinct is stronger than the exchange-coupling force which works via the intermediate magnetic film; and in a temperature area equal to or higher than the temperature Tsw1, the exchange-coupling force which works via the intermediate magnetic film becomes stronger than the force which causes the domains in the readout magnetic film to become extinct, thereby copying the domains retained in the recording magnetic film to the readout magnetic film via the Intermediate magnetic film.

Preferably, a Curie temperature Tc1 of the readout magnetic film, a Curie temperature Tc3 of the recording magnetic film, the temperature Tsw1, and the room temperature Troom satisfy the following relationship: Troom<Tsw1<Tc1 and Troom<Tsw1<Tc3.

The intermediate magnetic film may be an in-plane anisotropic magnetic film in the temperature area lower than the temperature Tsw1, and a perpendicular magnetic film in the temperature area equal to or higher than the temperature Tsw1.

In one embodiment, in a temperature area from room temperature Troom to a temperature Tsw1, a force which causes the domains in the readout magnetic film to become extinct is stronger than the exchange-coupling force which works via the intermediate magnetic film. In a temperature area equal to or higher than the temperature Tsw1, the exchange-coupling force which works via the intermediate magnetic film becomes stronger than the force which causes the domains in the readout magnetic film to become extinct; in a temperature area equal to or higher than a Curie temperature Tc2 of the intermediate magnetic film, magnetization of the intermediate magnetic film becomes extinct thereby cutting off the exchange-coupling between the recording magnetic film and the readout magnetic film; and the domains retained in the recording magnetic film are copied to the readout magnetic film via the intermediate magnetic film in a temperature area equal to or higher than the temperature Tsw1 and lower than the Curie temperature Tc2.

Preferably, a Curie temperature Tc1 of the readout magnetic film, a Curie temperature Tc3 of the recording magnetic film, the temperature Tc2, the temperature Tsw1, and the room temperature Troom satisfy the following relationship: Troom<Tsw1<Tc2, Tc2<Tc1, and Tc2<Tc3.

The intermediate magnetic film may be an in-plane anisotropic magnetic film in the temperature area lower than the temperature Tsw1, a perpendicular magnetic film in the temperature. area equal to or higher than the temperature Tsw1 and lower than a temperature Tsw2, and an in-plane anisotropic magnetic film in the temperature range equal to or higher than the temperature Tsw2. In such a case, a Curie temperature Tc1 of the readout magnetic film, a Curie temperature Tc3 of the recording magnetic film, the temperature Tsw1, the temperature Tsw2, and the room temperature Troom satisfy the following relationship: Troom<Tsw1<Tcw2, Tsw2<Tc1, and Tsw2<Tc3.

In one embodiment, the intermediate magnetic film is made of a non-magnetic material, and in a temperature area from room temperature broom to a temperature Tsw1, a force which causes the domains in the readout magnetic film to become extinct is stronger than a magneto-static coupling force; and in a temperature area equal to or higher than the temperature Tsw1, the magneto-static coupling force becomes stronger than the force which causes the domains in the readout magnetic film to become extinct, thereby copying the domains retained in the recording magnetic film to the readout magnetic film via the intermediate magnetic film.

Preferably, a Curie temperature Tc1 of the readout magnetic film, a Curie temperature Tc3 of the recording magnetic film, the temperature Tsw1, and the room temperature Troom satisfy the following relationship: Troom<Tsw1<Tc1 and Troom<Tsw1<Tc3.

According to another aspect of the present invention, a disc cartridge is provided. The disc cartridge accommodates therein the magneto-optical recording medium of the present invention, and further includes a magnet for applying an initializing magnetic field to the magneto-optical recording medium in such a direction that the domains in the readout magnetic film become extinct.

Preferably, recorded information is read out by heating the readout magnetic film through irradiation of a readout light to the temperature Tsw1 or higher, thereby copying the domains retained in the recording magnetic film to the readout magnetic film with the exchange-coupling force, and utilizing reflected light from the readout magnetic film.

According to still another aspect of the present invention, a readout method of a magneto-optical recording medium is provided. The medium includes at least a readout magnetic film, an intermediate magnetic film and a recording magnetic film on a substrate, wherein information is recorded onto the recording magnetic film through magnetization of the recording magnetic film thereby forming domains therein, by a heating caused by irradiation of a recording light and application of a recording magnetic field, and the recorded information is read out through irradiation of a readout light thereby copying magnetization of the domains in the recording magnetic film to the readout magnetic film. The recording magnetic film is a perpendicular magnetic film in which the formed domains are retained. The intermediate magnetic film controls an exchange-coupling force between the recording magnetic film and the readout magnetic film. The readout magnetic film is a perpendicular magnetic film. In a temperature area from room temperature Troom to a temperature Tsw1, a force which causes the domains in the readout magnetic film to become extinct is stronger than the exchange-coupling force which works via the intermediate magnetic film, while in a temperature area equal to or higher than the temperature Tsw1, the exchange-coupling force which works via the intermediate magnetic film becomes stronger than the force which causes the domains in the readout magnetic film to become extinct. A Curie temperature Tc1 of the readout magnetic film, a Curie temperature Tc3 of the recording magnetic film, the temperature Tsw1, and the room temperature Troom satisfy the following relationship: Troom<Tsw1<Tc1 and Troom<Tsw1<Tc3. The readout method of the invention includes the step of reading out recorded information by heating the readout magnetic film through irradiation of a readout light to the temperature Tsw1 or higher, thereby copying the domains retained in the recording magnetic film to the readout magnetic film with the exchange-coupling force, and utilizing reflected light from the readout magnetic film.

In one embodiment, the readout method of the invention further includes the step of applying an Initializing magnetic field to the magneto-optical recording medium In such a direction that the domains in the readout magnetic film become extinct.

According to still another aspect of the present invention, a readout method of a magneto-optical recording medium is provided. The medium includes at least a readout magnetic film, an intermediate magnetic film and a recording magnetic film on a substrate, wherein information is recorded onto the recording magnetic film through magnetization of the recording magnetic film thereby forming domains therein, by a heating caused by irradiation of a recording light and application of a recording magnetic field, and the recorded information is read out through irradiation of a readout light thereby copying magnetization of the domains in the recording magnetic film to the readout magnetic film. The recording magnetic film is a perpendicular magnetic film in which the formed domains are retained. The readout magnetic film is a perpendicular magnetic film. In a temperature area from room temperature Troom to a temperature Tsw1, a force which causes the domains in the readout magnetic film to become extinct is stronger than the exchange-coupling force which works via the intermediate magnetic film, while in a temperature area equal to or higher than the temperature Tsw1, the exchange-coupling force which works via the intermediate magnetic film becomes stronger than the force which causes the domains in the readout magnetic film to become extinct. The intermediate magnetic film controls an exchange-coupling force between the recording magnetic film and the readout magnetic film, magnetization of the intermediate magnetic film becoming extinct in a temperature area equal to or higher than its Curie temperature Tc2 to cut off exchange-coupling between the recording magnetic film and the readout magnetic film. The domains retained in the recording magnetic film are copied to the readout magnetic film via the intermediate magnetic film in a temperature area equal to or higher than the temperature Tsw1 and lower than the Curie temperature Tc2. A Curie temperature Tc1 of the readout magnetic film, a Curie temperature Tc3 of the recording magnetic film, the temperature Tc2, the temperature Tsw1, and the room temperature Troom satisfy the following relationship: Troom<Tsw1<Tc2, Tc2<Tc1, and Tc2<Tc3. The readout method of the invention includes the step of reading out recorded information by heating the intermediate magnetic film through irradiation of a readout light to the Curie temperature Tc2 or higher, thereby copying the domains retained in the recording magnetic film to the readout magnetic film with the exchange-coupling force in the temperature range equal to or higher than the temperature Tsw1 and lower than the temperature Tc2, and utilizing reflected light from the readout magnetic film.

Thus, the invention described herein makes possible the advantages of (1) providing a magneto-optical recording medium exhibiting high-resolution and high-performance readout characteristics by reading out a recorded signal only from a particular temperature area inside a readout beam spot without any need for an initialization magnetic field, and (2) providing a readout method for a magneto-optical recording medium suitable for a high-density recording by using such a magneto-optical recording medium.

These and other advantages of the present invention will become apparent to those skilled in the art upon reading and understanding the following detailed description with reference to the accompanying figures.

BRIEF DESCRIPTION OF THE DRAWINGS

FIG. 4A illustrates a state viewed from the side of a recording magnetic film; and FIG. 4B illustrates a state viewed from the side of a readout magnetic film.

FIG. 5A illustrates the measurement result when the Gd composition ratio of the readout magnetic film (GdFeCo film) is about 28%; FIG. 5B illustrates the measurement result when the Gd composition ratio is about 27%; and FIG. 5C illustrates the measurement result when the Gd composition ratio is about 26%.

FIG. 6A is a plan view showing a part of a track thereof; and FIG. 6B is a cross-sectional view showing the configuration (and the magnetized directions, in particular) of the magnetic films thereof.

FIG. 7A is a plan view showing a part of a track thereof; and FIG. 7B is a cross-sectional view showing the configuration (and the magnetized directions, in particular) of the magnetic films thereof.

FIG. 8A is a plan view showing a part of a track thereof; and FIG. 8B is a cross-sectional view showing the configuration (and the magnetized directions, in particular) of the magnetic films thereof.

FIG. 9A is a graph illustrating the temperature dependence of a coercive force; and FIG. 9B is a plan view showing a part of a track thereof.

FIGS. 10A and 10B illustrate the readout operation of a magneto-optical recording medium in the sixth example of the present invention, and in particular: FIG. 10A is a graph illustrating the temperature dependence of a coercive force; and FIG. 10B is a plan view showing a part of a track thereof.

DESCRIPTION OF THE PREFERRED EMBODIMENTS

Figures 1A, 1B:
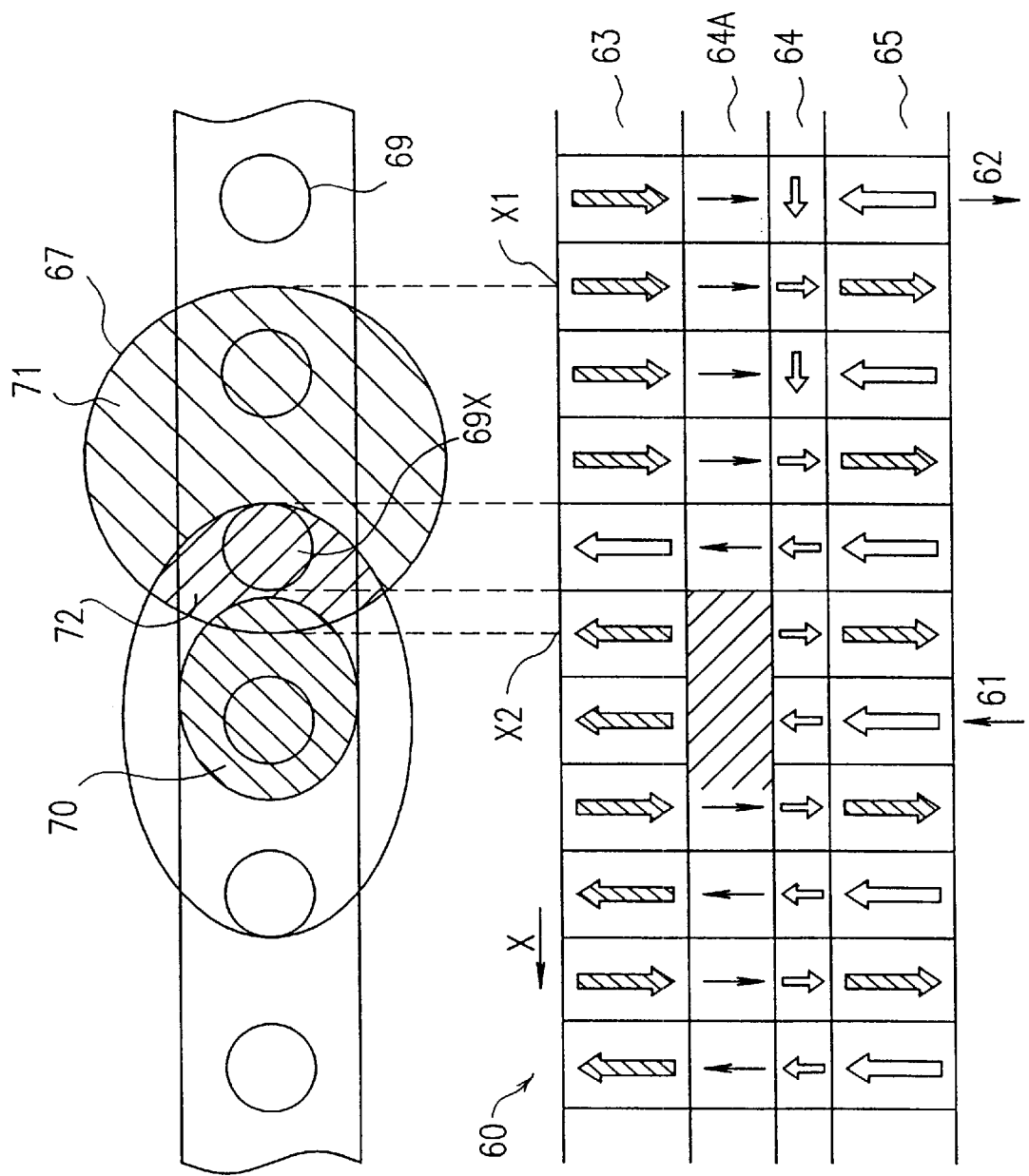
FIG. 1A is a plan view showing a part of a track of an exemplary conventional magneto-optical recording medium.
FIG. 1B is a cross-sectional view showing the configuration (and the magnetized directions, in particular) of the magneto-optical recording medium.
Figure 2A:
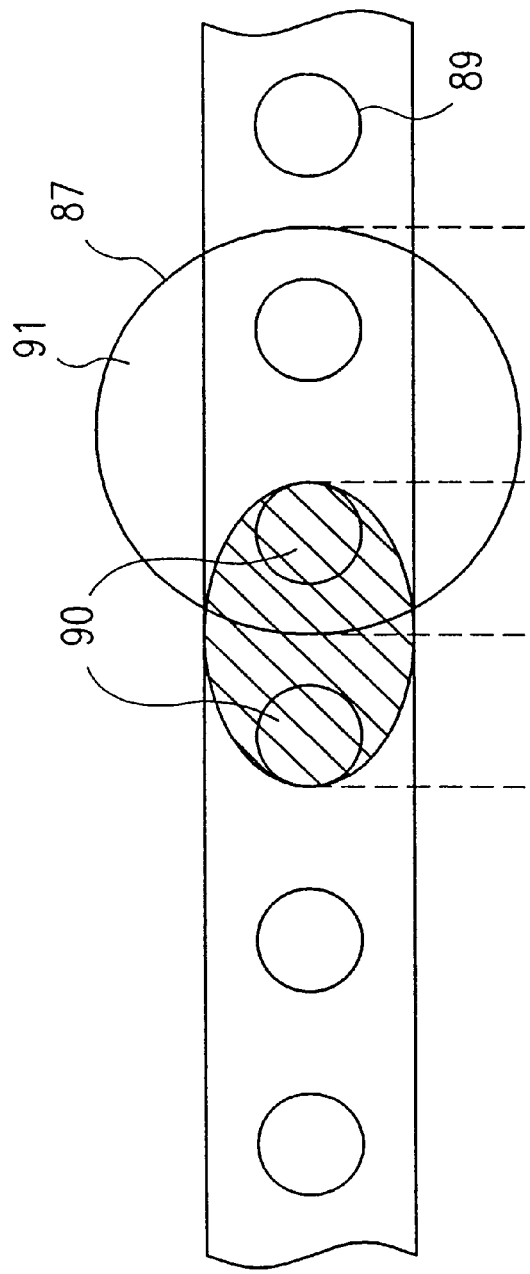
FIG. 2A is a plan view showing a part of a track of another exemplary conventional magneto-optical recording medium.
Figure 2B:
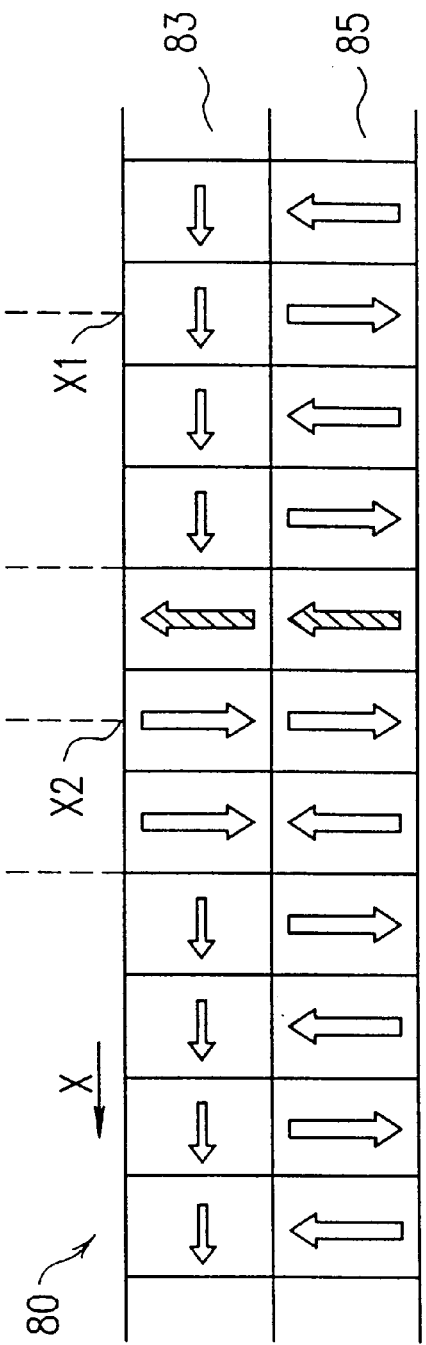
FIG. 2B is a cross-sectional view showing the configuration (and the magnetized directions, in particular) of the magneto-optical recording medium.
Figure 3:
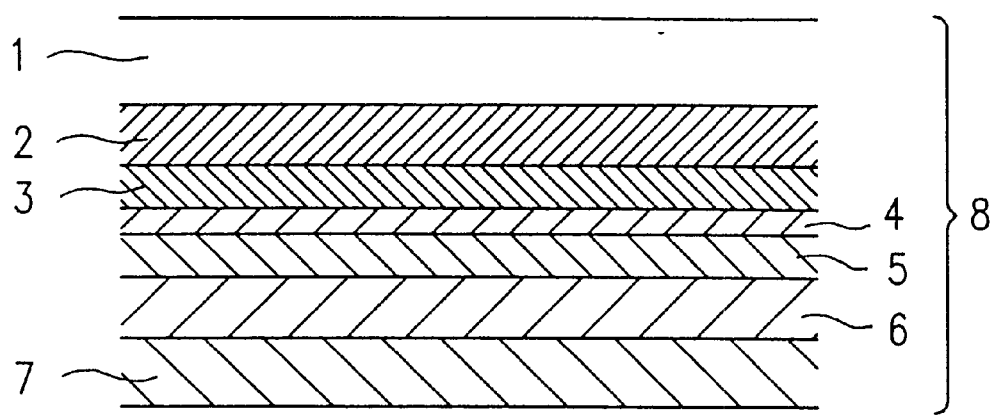
FIG. 3 is a cross-sectional view showing the configuration of a magneto-optical recording medium commonly used for various examples of the present invention.

FIG. 3 is a cross-sectional view showing a configuration of a magneto-optical recording medium 8 commonly used for various examples of the present invention.

The magneto-optical recording medium 8 is formed so as to include: a substrate 1; a first protection film 2; a readout magnetic film 3; an intermediate magnetic film 4; a recording magnetic film 5; a second protection film 6; and a protection layer 7, all of these films and layers being stacked in this order on the substrate 1.

The substrate 1 is used as a substrate for the magneto-optical recording medium 8, and is typically made of glass, plastic or the like. The first and second protection films 2 and 6 may be made of ZnS or the like. The readout magnetic film 3 may be made of GdFeCo or the like. The intermediate magnetic film 4 may be made of GdFe, AlN, GdFeCo or the like. The recording magnetic film 5 may be a magnetic film made of TbFeCo or the like in which information is to be recorded. The recording state of the information is determined (i.e., the recorded information is retained) depending upon whether or not a domain is formed in the recording magnetic film 5. The protection layer 7 may be made of an epoxyacrylate resin, for example.

The magneto-optical recording medium 8 is fabricated by forming the respective films 2 to 6 on the substrate 1 in accordance with a sputtering method or an evaporation method, and then by forming the protection layer 7 thereon in accordance with a spin coating method after these films have been formed. For example, the thicknesses of the respective films 2 to 6 are set as follows: the thicknesses of the protection films 2 and 6 are set to be about 60 nm to about 120 nm; the thickness of the readout magnetic film 3 about 10 nm to about 80 nm; the thickness of the intermediate magnetic film 4 about 5 nm to about 50 nm, and the thickness of the recording magnetic film 5 about 30 nm to about 100 nm.

Figure 4A:
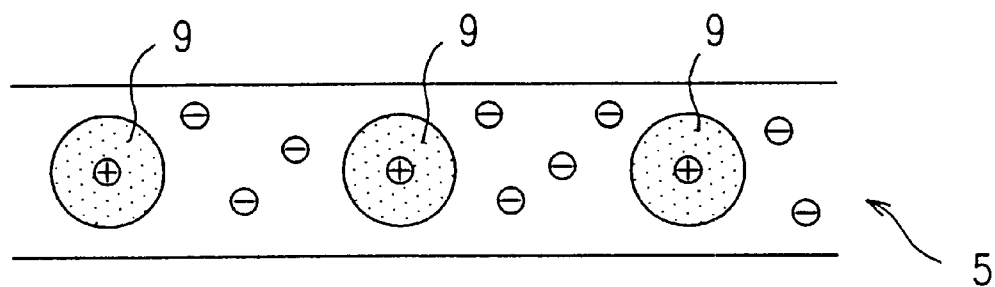
FIGS. 4A and 4B are representations schematically illustrating states of a track at room temperature, in which track domains have been formed in accordance with a thermomagnetical recording method, and in particular.
Figure 4B:
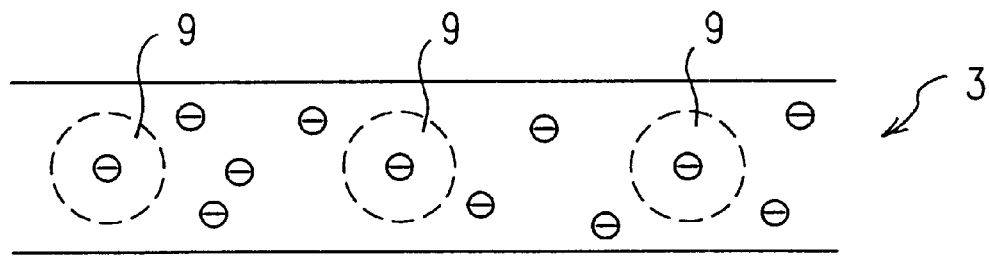

FIGS. 4A and 4B schematically illustrate states of a track at room temperature, in which domains 9 have been formed in accordance with a thermo-magnetical recording method. FIG. 4A illustrates a state viewed from the side of the recording magnetic film 5, while FIG. 4B illustrates a state viewed from the side of the readout magnetic film 3. In these figures, the polarity in the generated domains 9 is represented as "+(plus)" and the polarity in the regions where the domains 9 have not been generated is represented as "–(minus)", which means that the magnetization direction is opposite to that in the domains 9.

As shown in FIG. 4A, the domains 9 are formed In the recording magnetic film 5 so as to have a "+" polarity. On the other hand, the readout magnetic film 3 of the present invention has a strong self-shrinkage force and the coupling force received from the recording magnetic film 5 is weakened by the intermediate magnetic film 4. Thus, the magnetized direction of the domains 9 is attracted to the polarity in the regions surrounding the domains 9 (ice., to the "–" direction). Consequently, the domains 9 in the readout magnetic film 3 which are originally supposed to be copied from the recording magnetic film 5 shrink, so that no domains 9 are formed in the readout magnetic film 3 (such a state is illustrated by the dashed circles in FIG. 4B). According to the present invention, an initialization operation is performed by utilizing such a shrinkage phenomenon of the readout magnetic film 3.

In a conventional magneto-optical recording medium using a perpendicular magnetic film as a readout magnetic film, the initialization operation is performed by aligning the magnetized directions of the readout magnetic film in one direction. Thus, domains remain in the readout magnetic film until the initialization magnetic field is impressed.

In contrast, in the magneto-optical recording medium of the present invention, although the domains 9 are formed in the readout magnetic film 3 upon reading out the recorded information, those domains 9 in the readout magnetic film 3 become substantially automatically extinct by utilizing the shrinkage force of the readout magnetic film 3 (i.e., the domains 9 are not retained in the readout magnetic film 3). Thus, the magnetized directions become unidirectional throughout the readout magnetic film 3 at a timing other than the readout operation, even if such methods as that using an initialization magnetic field are not employed.

Next, the magnetic properties of the readout magnetic film used in the magneto-optical recording medium of the present invention will be described with reference to FIGS. 5A to 5C.

Figure 5C:
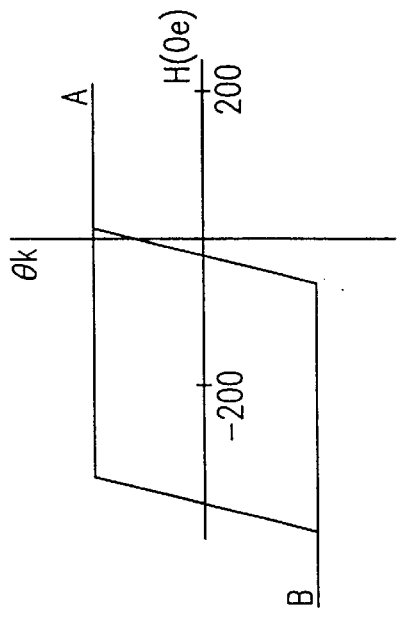
FIGS. 5A to 5C are graphs illustrating the magnetic properties (the Kerr hysteresis loops and the magnetized directions in a single-layer state) of a readout magnetic film (GdFeCo film) used in the magneto-optical recording medium of the present invention, and in particular.
Figure 5B:
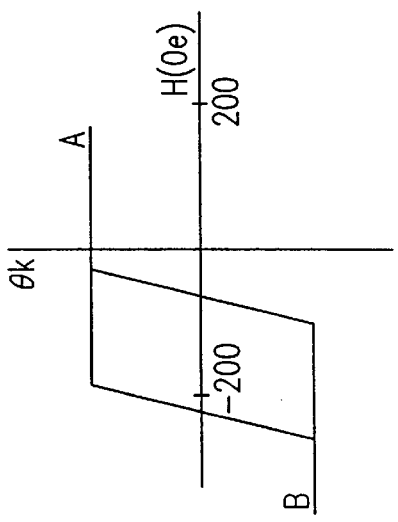
Figure 5A:
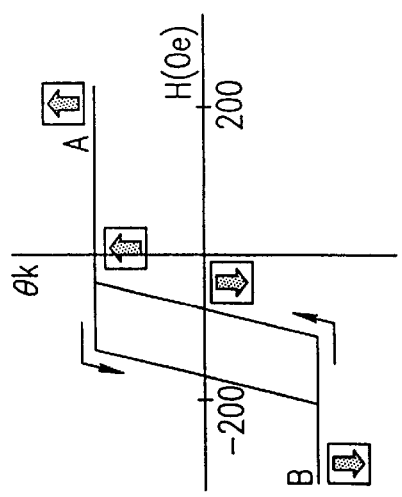

FIGS. 5A to 5C illustrate the Kerr hysteresis loops and the magnetization states of a single-layer readout magnetic film. In FIGS. 5A to 5C, the axis of the abscissas represents the intensity of a magnetic field H and the axis of the ordinates represents a Kerr rotation angle $\Theta k$. The readout magnetic film is a GdFeCo film having a thickness of about 500 Å which has been formed over the substrate and has com-pletely been magnetized to the "+" direction. It is noted that FIG. 5A illustrates the measurement result when the Gd composition ratio of the readout magnetic film (GdFeCo film) is about 28%, FIG. 5B illustrates the measurement result when the Gd composition ratio is about 27%, and FIG. 5C illustrates the measurement result when the Gd composition ratio is about 26%.

As shown in FIG. 5A, if the magnetic field H is impressed upon the readout magnetic film from the "+" region to the "–" region, the magnetized direction indicated by the arrow A in FIG. 5A is reversed into the magnetized direction indicated by the arrow B when a magnetic field of about –180 Oe is impressed. Conversely, if the magnetic field H is impressed upon the readout magnetic film in the magnetization state B toward the "+" region, the magnetized direction of the readout magnetic film is reversed again into the magnetized direction, indicated by the arrow A, when a magnetic field of about –70 Oe on the "–" region with respect to zero is impressed. Such a reversal of magnetization from A to B corresponds to the case where the domains are formed by recording signals in a single-layer readout magnetic film. On the other hand, a reversal of magnetization reversal in the opposite direction, i.e., from B to A, corresponds to the case where the domains are erased from the readout magnetic film.

In general, in a magnetic film to be used as a recording magnetic film, a magnetic field at which the magnetization is reversed from B to A has a polarity which is inverse to that of the magnetic field in which the magnetization is reversed from A to B. Thus, in a state where no magnetic field exists, the magnetization is attracted to the direction of the recording magnetic field and the domains can be retained.

On the other hand, in the readout magnetic film of the present invention, the magnetic field in which the magnetization is inverted from B to A is on the "–" region as described above with reference to FIG. 5A. This means that it is possible to recover the magnetization state A even when no magnetic field exists. Specifically, this is because the domains in the readout magnetic film are affected by the surrounding magnetization which has been magnetized to the "+" region, resulting in shrinkage and extinction (erasure) of the domains.

Moreover, if the graphs of FIGS. 5A to 5C illustrating the respective measurement results for different Gd composition ratios in the readout magnetic film are compared with each other, it can be understood that the shrinkage force of the domains in the readout magnetic film decreases as the Gd composition ratio in the readout magnetic film decreases. That is to say, the shrinkage force becomes smallest in the case of FIG. 5C of the three cases shown in FIGS. 5A to 5C. Thus, by controlling the Gd composition ratio in a readout magnetic film, a readout magnetic film can be formed so as to have the desired shrinkage force.

It is noted that the respective magnetic films of the magneto-optical recording medium of the present invention are formed by a sputtering method in which the gas pressure during the deposition is set, for example, at about 10 mTorr. The Gd composition ratio of a magnetic film to be formed is variable depending upon various deposition conditions during the fabrication process thereof, such as gas pressure, bias magnetic field, or the type of sputtering gas, as well as various factors associated with the apparatus to be used. For example, if the gas pressure during the deposition is varied from about 12 mTorr to about 4 mTorr, the Gd composition ratio in GdFeCo is varied from about 24% to about 28%. Consequently, if the deposition conditions are appropriately set, the above-described shrinkage operation is realized in the readout magnetic film included in the magneto-optical recording medium of the present invention by setting the Gd composition ratio in the component material of GdFeCo in the range from about 15% to about 30%.

A GdFeCo film is used as an exemplary readout magnetic film in the foregoing description. Alternatively, the readout magnetic film may be a magnetic film containing any other rare earth transition metal, a Mn-containing magnetic film or a magnetic film made of any other type. In particular, the readout magnetic film may be composed of GdFeCo, GdFe, GdCo, DyFeCo, MnBi or the like.

Hereinafter, various embodiments of the magneto-optical recording medium and the readout method thereof according to the present invention will be described with reference to the accompanying drawings. In the various embodiments of the magneto-optical recording medium of the present invention to be described below, the same configuration as that described above is commonly used for the respective magnetic films but the magnetic properties of each of the magnetic films are different from each other among the following embodiments.

EXAMPLE 1

Figure 6A:
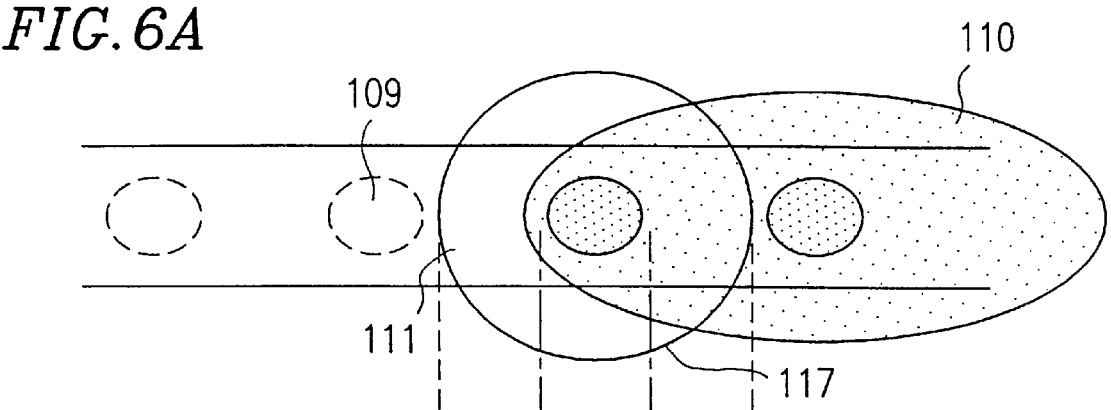
FIGS. 6A and 6B are views illustrating the readout operation of a magneto-optical recording medium in the first example of the present invention, and in particular.
Figure 6B:
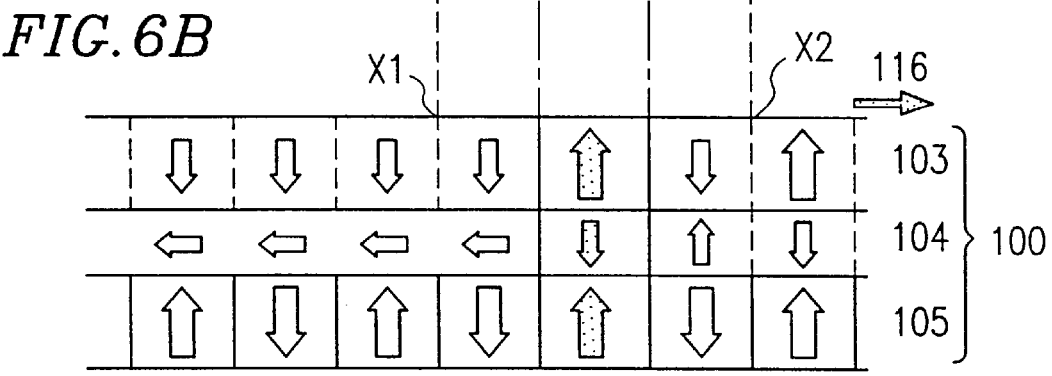

FIGS. 6A and 6B illustrate the readout operation of a magneto-optical recording medium 100 in the first example of the present invention. Specifically, FIG. 6A is a plan view showing part of a track of the magneto-optical recording medium 100, while FIG. 6B is a cross-sectional view showing the magnetized directions of the magnetic films included in the magneto-optical recording medium 100.

As shown in the cross-sectional view in FIG. 6B, the magneto-optical recording medium 100 includes a readout magnetic film 103, an intermediate magnetic film 104 and a recording magnetic film 105 formed on a substrate (not shown). The arrow 116 indicates the tangential direction of the magneto-optical recording medium 100 along the tracks.

As shown in the plan view in FIG. 6A, when information is read out, a readout beam spot 117 is formed by irradiating a laser beam onto the range from X1 to X2 shown in FIG. 6B along the track. When the laser beam is irradiated onto the rotating magneto-optical recording medium 100 the temperature distribution of the magnetic film structure including the readout magnetic film 103 is not in rotation symmetry with respect to the center of the circle formed by the readout beam spot 117. More specifically, an area 110 which has already been irradiated with the readout beam spot 117 becomes a high temperature area 110. In this high temperature area 110, the temperature of the readout magnetic film 103 rises to a temperature Tsw1 at which domains 109 are formed by the exchange-coupling force, or higher. On the other hand, a low temperature area 111 having a temperature lower than Tsw1 is formed outside of the high temperature area 110.

Signals (or information) have been recorded beforehand as domains 109 in the recording magnetic film 105 in a thermo-magnetical manner. During the readout of information, when a readout laser beam is irradiated onto the rotating magneto-optical recording medium 100, no domains 109 are formed in the low temperature area 111 because the magnetization of the readout magnetic film 103 is affected at such a temperature lower than Tsw1 by the surrounding magnetic field. On the other hand, in the high temperature area 110 having a temperature equal to or higher than Tsw1, the magnetization of the intermediate magnetic film 104 is weakened and the exchange-coupling force to be applied from the recording magnetic film 105 upon the readout magnetic film 103 becomes stronger than the shrinkage force of the domains in the readout magnetic film 103. Thus, the domains 109 are copied from the recording magnetic film 105 onto the readout magnetic film 103 via the intermediate magnetic film 104. However, in the part corresponding to the low temperature area 111 inside the readout beam spot 117, the domain 109 is masked so that information is read out as a readout signal only from the domain 109 existing only at the location corresponding to the high temperature area 110.

In this manner, in the magneto-optical recording medium 100 of the first example, even if the domain 109 is smaller than the readout beam spot 117, information can be read out at a high density without causing any interaction of waveform of the readout signals among the adjacent domains 109.

It is noted that in order to read out information from the magneto-optical recording medium 100 of the first example at a high density, heating needs to be performed so as to obtain an area having a temperature of Tsw1 or higher upon the irradiation of the readout laser beam.

In this case, the Curie temperature Tc3 of the recording magnetic film 105 of the magneto-optical recording medium 100 is set at about 250° C. in order to stabilize the domains 109 which have been recorded in a thermo-magnetical manner.

Each magnetic film may be easily made of a rare earth metal-transition metal amorphous alloy because such a film can be easily produced and the magnetic properties thereof can be easily controlled Moreover, the intermediate magnetic film 104 to be used for controlling the exchange-coupling force between the readout magnetic film 103 and the recording magnetic film 105 is preferably formed of an in-plane anisotropic magnetic film, in view of the intended purpose thereof. Specifically, the intermediate magnetic film 104 may be composed of GdFeCo, GdFe, GdCo, DyFe or the like. In this example, the intermediate magnetic film 104 is made of GdFe.

In order to realize the operation in a temperature area of Tsw1 or higher, the composition of each of the magnetic films used in the magneto-optical recording medium 100 of this example is required to be set so as to satisfy the following conditions.

When a disk drive is operated, the temperature inside the device rises to about 50° C. in view of the variation in ambient temperature. In order to secure sufficient power required for readout even under such a situation, Tsw1 is desirably set to at least 80° C. Nevertheless, if Tsw1 is higher than the Curie temperature Tc3 of the recording magnetic film 105, the domains 109 of the recording magnetic film 105 are destroyed at the time of readout. Thus, Tsw1 is required to be set at a temperature lower than Tc3. It is noted that the Curie temperature Tc3 of the recording magnetic film 105 is generally set at such a temperature so as to realize a recording sensitivity at which recording can be performed by a semiconductor laser device. Thus, Tc3 is preferably set in the range from about 180° C. to about 300° C. Furthermore, the Curie temperature Tc1 of the readout magnetic film 103 is required to be set at Tsw1 or higher so that the magnetization can be held in a temperature area of Tsw1 or higher.

Considering these requirements, Tsw1 is preferably set in the range from about 100° C. to about 250° C. According to the results of experiments conducted by the present inventors, the Gd composition ratio causing Tsw1 in this specific range is in the range from about 15% to about 30% in the readout magnetic film 103. Furthermore, in order to improve the quality of the readout signal and prevent the domains of the recording magnetic film 105 from being destroyed, Tsw1 is preferably set at as high a temperature as possible within the above-specified permissible temperature range. In view of these aspects, the Gd composition ratio is suitably set in the range from about 18% to about 25% and Tsw1 is suitably set in the range from about 130° C. to about 180° C.

For example, in the magneto-optical recording medium 100, Tsw1 is set at about 120° C., the readout magnetic film 103 is composed of $Gd_{22}Fe_{64}Co_{14}$, the intermediate magnetic film 104 is composed of $Gd_{50}Fe_{50}$ and the recording magnetic film 105 is composed of $Tb_{20}Fe_{65}Co_{15}$.

EXAMPLE 2

Figure 7A:
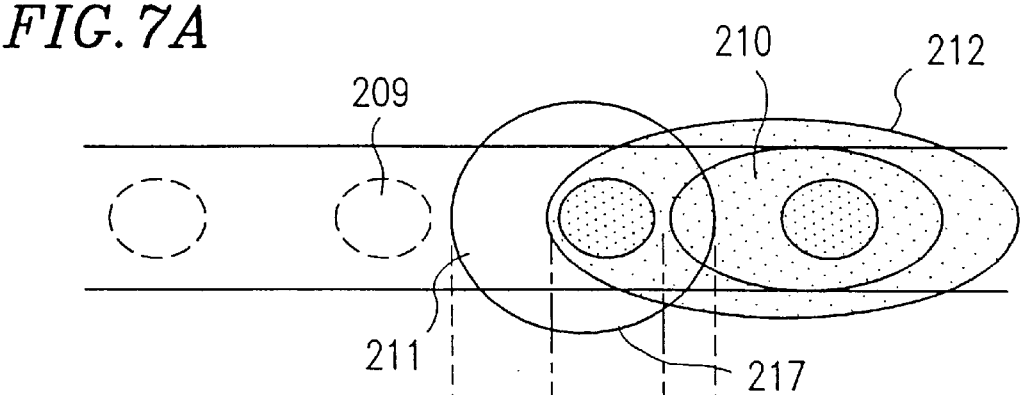
FIGS. 7A and 7B are views illustrating the readout operation of a magneto-optical recording medium in the second example of the present invention, and in particular.
Figure 7B:
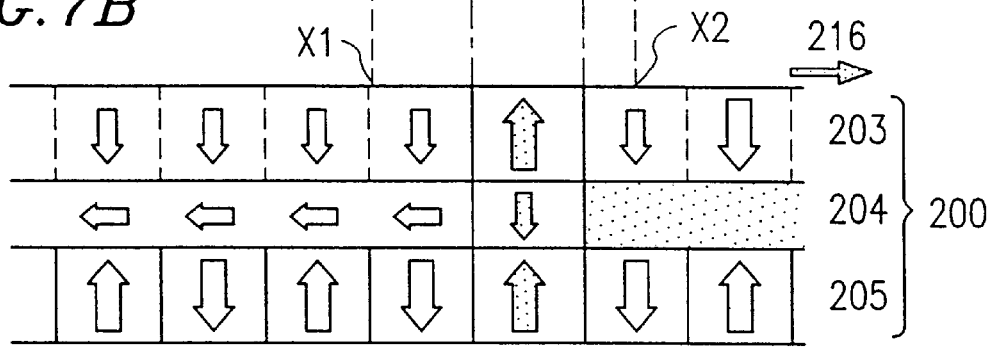

FIGS. 7A and 7B illustrate the readout operation of a magneto-optical recording medium 200 in the second example of the present invention. Specifically, FIG. 7A is a plan view showing part of the track of the magneto-optical recording medium 200, while FIG. 7B is a cross-sectional view showing the magnetized directions of the magnetic films included in the magneto-optical recording medium 200.

As shown in the cross-sectional view in FIG. 7B, the magneto-optical recording medium 200 includes a readout magnetic film 203, an intermediate magnetic film 204 and a recording magnetic film 205 which have been formed on a substrate (not shown). In FIG. 7B, the arrow 216 indicates the tangential direction of the magneto-optical recording medium 200 along the tracks.

When information is read out, a readout beam spot 217 is formed as shown in the plan view in FIG. 7A by irradiating a laser beam onto the range from X1 to X2 shown in FIG. 7B along the track. When the laser beam is irradiated onto the rotating magneto-optical recording medium 200, the temperature distribution of the magnetic film structure including the readout magnetic film 203 is not in rotation symmetry with respect to the center of the circle formed by the readout beam spot 217. More specifically, an area 210 which has already been irradiated with the readout beam spot 217 becomes a high temperature area 210. In this example, the intensity of the readout laser beam is adjusted so that the temperature of the high temperature area 210 becomes equal to or higher than the Curie temperature Tc2 of the intermediate magnetic film 204. On the other hand, a low temperature area 211 having a temperature lower than Tsw1, as well as an intermediate temperature area 212 having a temperature equal to or higher than Tsw1 and lower than Tc2, are formed outside of the high temperature area 210.

Signals (or information) have been recorded beforehand as domains 209 in the recording magnetic film 205. During the readout of information, when a readout laser beam is irradiated onto the rotating magneto-optical recording medium 200, no domains 209 are formed in the low temperature area 211 because the magnetization of the readout magnetic film 203 is affected by the surrounding magnetic field at a temperature lower than Tsw1. Thus, the magnetized directions of the readout magnetic film 203 are aligned in one direction. On the other hand, in the high temperature area 210, the temperature of the intermediate magnetic film 204 becomes Tc2 or higher and the exchange-coupling force between the recording magnetic film 205 and the readout magnetic film 203 is cut off. Consequently, the information stored in the recording magnetic film 205 is not copied onto the readout magnetic film 203.

In contrast, in the intermediate temperature area 212 having a temperature equal to or higher than Tsw1 and lower than Tc2, the magnetization of the intermediate magnetic film 204 is weakened and a strong exchange-coupling force is applied upon the readout magnetic film 203. When the exchange-coupling force becomes stronger than the shrinkage force of the domains 209, the domains 209 are copied onto the readout magnetic film 203 via the intermediate magnetic film 204.

Accordingly, in the magneto-optical recording medium 200 of the second example, the domain 209 is masked in the area corresponding to the low temperature area 211 inside the readout beam spot 217 and the high temperature area 210, so that the recorded information cannot be read out therefrom As a result, the information is read out as a readout signal only from the domain 209 existing at the location corresponding to the intermediate temperature area 212.

Consequently, in the magneto-optical recording medium 200 of this example, even if a domain 209 is smaller than that of the magneto-optical recording medium 100 of the first example is used, information can be read out at a high density without causing any interaction of waveform on the readout signals among the adjacent domains 209.

It Is noted that in order to read out information from the magneto-optical recording medium 200 of the second example at a high density, heating needs to be performed so as to obtain an area having a temperature equal to or higher than the Curie temperature Tc2 of the intermediate magnetic film 204 upon the irradiation of the readout laser beam.

The intermediate magnetic film 204 of the magneto-optical recording medium 200 is used for controlling the exchange-coupling force between the readout magnetic. film 203 and the recording magnetic film 205 or for cutting off the exchange-coupling force under certain conditions. Thus, the compositions of the respective magnetic films of the magneto-optical recording medium 200 need to be determined so as to satisfy the requirements described above in the first example, and a further requirement Is that the Curie temperature Tc2 of the intermediate magnetic film 204 should be lower than Tsw1.

Furthermore, in order to realize a copy of the domains and prevent the domains from being destroyed in the temperature ared having a temperature equal to or higher than Tsw1 and lower than Tc2, the relationships Tc2<Tc1 and Tc2<Tc3 are required to be satisfied among Tc2, the Curie temperature Tc1 of the readout magnetic film 203, and the Curie temperature Tc3 of the recording magnetic film 205.

In order to copy the domains 209 in the intermediate temperature area 212 with certainty, the temperature difference between Tsw1 and Tc2 is required to be at least equal to 10° C. Thus, If Tsw1 is 80° C. or higher, it is preferable that Tc2 is at least equal to 90° C. Furthermore, considering that Tc3 is set in the range from about 180° C. to about 300° C., Tsw1 is preferably set in the range from about 100° C. to about 250° C. and Tc2 is preferably set in the range from about 110° C. to about 260° C. in order to prevent the domains from being destroyed Furthermore, in order to improve the quality of a readout signal, Tsw1 is preferably set at as high a temperature as possible within the above-specified permissible temperature range. In view of these respects, Tsw1 is suitably set in the range from about 130° C. to about 180° C. and Tc2 is suitably set in the range from about 140° C. to about 190° C.

For example, In the magneto-optical recording medium 200, Tsw1 is set at about 120° C., Tc2 is set at about 180° C., the readout magnetic film 203 is composed of $Gd_{22}Fe_{64}Co_{14}$, the intermediate magnetic film 204 is composed of $Gd_{50}Fe_{50}$ and the recording magnetic film 205 is composed of $Tb_{20}Fe_{65}Co_{15}$.

EXAMPLE 3

Figure 8A:
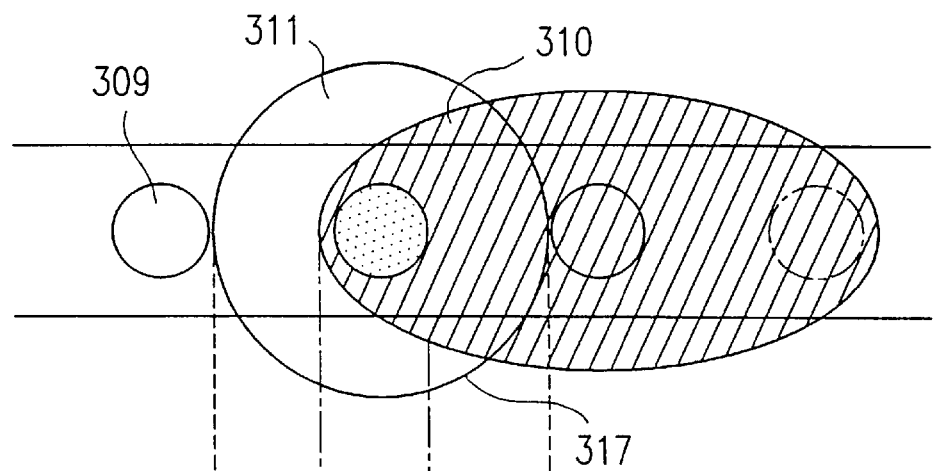
FIGS. 8A and 8B are views illustrating the readout operation of a magneto-optical recording medium in the third example of the present invention, and in particular.
Figure 8B:
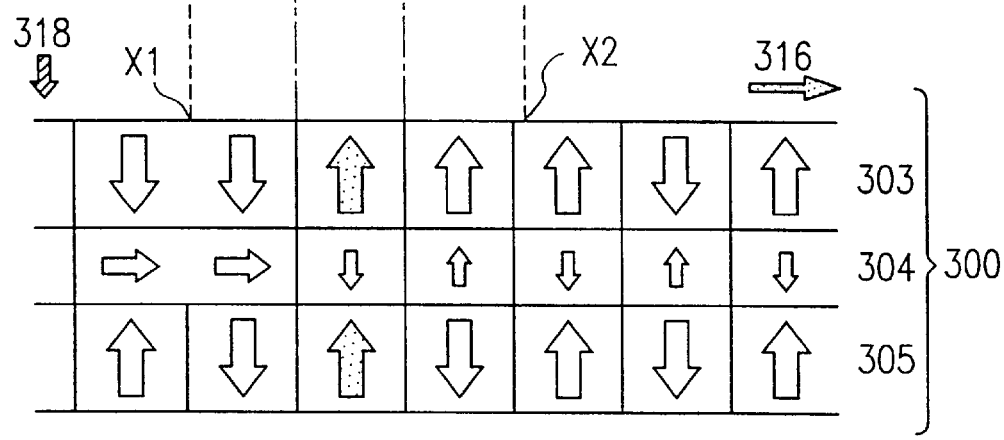

FIGS. 8A and 8B illustrate the readout operation of a magneto-optical recording medium 300 in the third example of the present invention. Specifically, FIG. 8A is a plan view showing a part of a track of the magneto-optical recording medium 300, while FIG. 8B is a cross-sectional view showing the magnetized directions of the magnetic films included in the magneto-optical recording medium 300.

As shown in the cross-sectional view in FIG. 8B, the magneto-optical recording medium 300 includes a readout magnetic film 303, an intermediate magnetic film 304 and a recording magnetic film 305 which have been formed on a substrate (not shown). In FIG. 8B, the arrow 316 indicates the tangential direction of the magneto-optical recording medium 300 along the tracks.

The readout operation of the magneto-optical recording medium 300 of the third example is substantially the same as that of the magneto-optical recording medium 100 of the first example. More specifically, in a low temperature area 311 having a temperature lower than Tsw1, no domains 309 are formed by the shrinkage of the domains in the readout magnetic film 303. The domains 309 are copied onto the readout magnetic film 303 only in a high temperature area 310 having a temperature of Tsw1 or higher The detailed description of the readout operation will be omitted herein, in view of the overlapping between the first and the third examples.

Assuming the upper limit of the temperature inside the device to be 80° C. when a disk drive is operated, Tsw1 is suitably set in the range from about 130° C. to about 180° C. However, even if Tsw1 is set within this specific range, once the temperature inside the device becomes higher than the above-assumed upper limit, the domains 309 copied to the readout magnetic film 303 may not shrink easily in some actual applications even after the temperature has again decreased to a temperature equal to or lower than Tsw1 at which state it ordinarily causes the shrinkage of the domains 309 to be established.

Thus, in the magneto-optical recording medium 300 of this example, a weak magnetic field 318 having the same direction as the shrinkage direction of the domains 309 is impressed as an initialization magnetic field 318 in order to improve the reliability by ensuring the shrinkage of the domains 309. It is sufficient for the initialization magnetic field 318 to have an intensity of about 50 Oe to about 300 Oe. For example, a magnetic field having an intensity of about 100 Oe, which has been generated by using a rare earth metal magnet, is used as the initialization magnetic field 318.

It should be noted that in this example, the initialization magnetic field 318 need not be located in the vicinity of the readout laser beam spot 317, unlike in the conventional technology. Furthermore, a very weak magnetic field may be used as the initialization magnetic field 318. This makes it possible to incorporate a rare earth metal magnet or the like for generating the initialization magnetic field 318 into a disk cartridge containing the magneto-optical recording medium.

EXAMPLE 4

Next, the magneto-optical recording medium of the fourth example will be described. The fundamental configuration and the readout operation of the magneto-optical recording medium of this example are similar to those of the magneto-optical recording medium 100 of the first example as described with reference to FIGS. 6A and 6B. Thus, the detailed description thereof will be omitted herein.

The magneto-optical recording medium of this example is partly characterized in that copying of domains is realized by magneto-static force. More specifically, in this example, the intermediate magnetic film is made of a non-magnetic material (however, the reference "intermediate magnetic film" is still used in this example, although the film is made of a non-magnetic film). In such a case, the readout magnetic film is magneto-statically coupled with the recording magnetic film since magnetization of the two magnetic films are attracted with each other via the intermediate magnetic film.

In the readout magnetic film included in the magneto-optical recording medium of this example, a force acting to extinguish the domains formed in the readout magnetic film is stronger than a magneto-static coupling force in an area where the temperature is in the range from room temperature to Tsw1. On the other hand, in an area where the temperature is equal to or higher than Tsw1, the magneto-static force becomes stronger than the force acting to extinguish the domains. Consequently, the domains held in the recording magnetic film are copied by the magneto-static coupling force onto the readout magnetic film.

In this example, the above-described operation is realized by using a non-magnetic material as the constituent material of the intermediate magnetic film. The above-described readout operation can be realized by using a film made of a nitride such as SiN or AlN, or a chalcogenide such as ZnS, as the intermediate magnetic film.

EXAMPLE 5

Next, the magneto-optical recording medium in the fifth example of the present invention will be described with reference to FIGS. 9A and 9B.

Figure 9A:
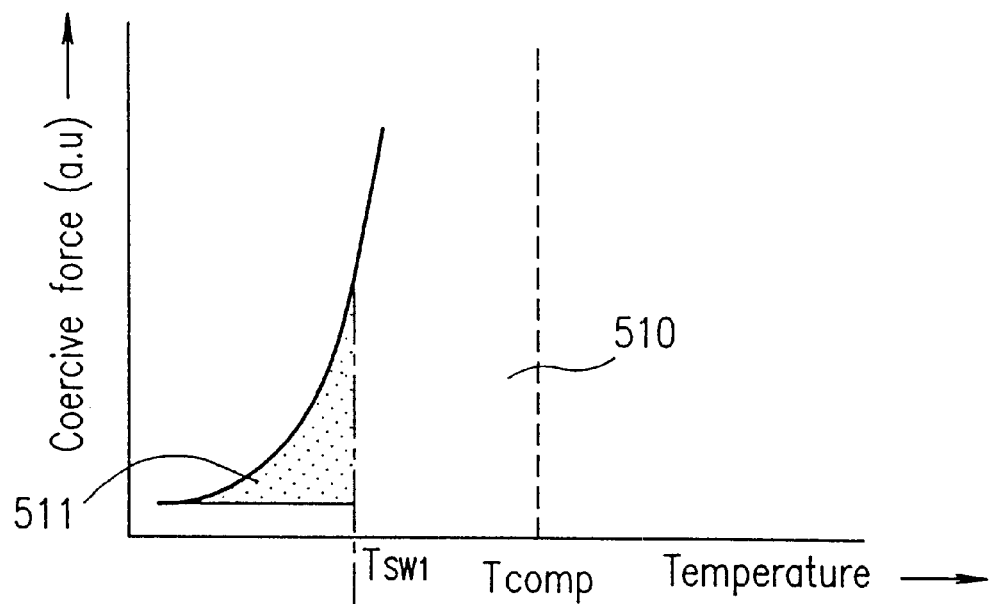
FIGS. 9A and 9B illustrate the readout operation of a magneto-optical recording medium in the fifth example of the present invention, and in particular.
Figure 9B:
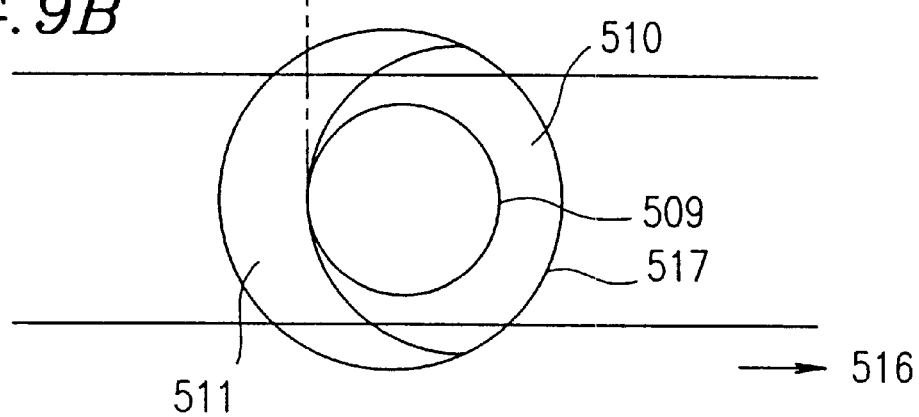

FIG. 9A is a graph illustrating the temperature dependence of the coercive force of an intermediate magnetic film in the magneto-optical recording medium of this example, while FIG. 9B is a plan view showing a readout beam spot 517 and the vicinity thereof on a track of the magneto-optical recording medium of this example. In FIG. 9A, the axis of the abscissas represents a temperature range from room temperature to a temperature Tsw1 or higher, and the axis of the ordinates represents the coercive force.

The intermediate magnetic film in the magneto-optical recording medium of this example forms an in-plane anisotropic magnetic film in an area 511 in which the temperature is lower than Tsw1 (<the compensation temperature Tcomp), and forms a perpendicular magnetic film in an area 510 in which the temperature is equal to or higher than Tsw1.

When a readout laser beam is irradiated onto the rotating magneto-optical recording medium during the readout of information, the readout beam spot 517 is formed. In this case, the temperature distribution of the magnetic film structure including the readout magnetic film is not in rotation symmetry with respect to the center of a circle formed by the readout beam spot 517, but shifts to the tangential direction of the medium.

Herein, it is assumed that a domain 509 is located at the center of the readout beam spot 517. As the magneto-optical recording medium moves (or rotates) in the direction indicated by the arrow 516, the area 510 having a temperature of Tsw1 or higher also shifts to the right side of this figure from the center of the readout beam spot 517. Thus, the area 511 having a temperature lower than Tsw1 is located on the left side with respect to the center of the readout beam spot 517 in this figure.

As described above, the intermediate magnetic film becomes a perpendicular magnetic film in the area 510 having a temperature of Tsw1 or higher as shown in FIGS. 9A and 9B. Thus, in this area 510, an exchange-coupling is generated between the readout magnetic film and the recording magnetic film, so that the domains 509 are copied. On the other hand, since the intermediate magnetic film is an in-plane anisotropic magnetic film in the area 511 having a temperature lower than Tsw1, the exchange-coupling force is no longer applied from the recording magnetic film to the readout magnetic film, so that the shrinkage force of the domains 509 in the readout magnetic film becomes stronger than the exchange-coupling force. Thus, the information recorded as the domains 509 is masked at the location corresponding to the area 511 having a temperature lower than Tsw1 within the readout beam spot 517. Consequently, the information is read out as a readout signal only from the domain 509 at the location corresponding to the high temperature area 510.

In this manner, in the magneto-optical recording medium of this example, even if the domain 509 is smaller than the readout beam spot 517, information can be read out at a high density without causing any interaction of waveform of the readout signals among the adjacent domains 509.

It is noted that in order to read out information from the magneto-optical recording medium of this example at a high density, heating needs to be performed so as to obtain an area having a temperature of Tsw1 or higher upon the irradiation of the readout laser beam.

In this case, the Curie temperature Tc3 of the recording magnetic film in the magneto-optical recording medium of this example is set at about 250° C. in order to stabilize the domains 509 which have been recorded in a thermomagnetical manner.

As in the above-described examples, each magnetic film may be easily made of a rare earth metal-transition metal amorphous alloy because such a film can be produced easily and the magnetic properties thereof can be controlled easily.

In order to realize the operation in a temperature area of Tsw1 or higher, the composition of the intermediate magnetic film used in the magneto-optical recording medium of this example needs to be determined so as to satisfy the following conditions.

When a disk drive is operated, in view of the variation In ambient temperature, the temperature inside the device rises to about 50° C. In order to secure sufficient power required for readout even under such a situation, Tsw1 is desirably set to at least 80° C. Nevertheless, if Tsw1 is higher than the Curie temperature Tc3 of the recording magnetic film, the domains 509 of the recording magnetic film are destroyed at the time of readout. Thus, Tsw1 is required to be set at a temperature lower than Tc3. It is noted that the Curie temperature Tc3 of the recording magnetic film is generally set at such a temperature so as to realize a recording sensitivity at which recording can be performed by a semiconductor laser device. Thus, Tc3 is preferably set in the range from about 180° C. to about 300° C. Furthermore, the Curie temperature Tc1 of the readout magnetic film is required to be set at Tsw1 or higher so that the magnetization can be held in a temperature area of Tsw1 or higher.

Considering these requirements, Tsw1 or a temperature at which the intermediate magnetic film is changed from an in-plane anisotropic magnetic film into a perpendicular magnetic film, is preferably set in the range from about 100° C. to about 250° C.

As a result of the experiments conducted by the present inventors, the component materials satisfying the above-described requirements include GdFeCo, GdFe, GdCo, DyFe and the like. Specifically, when the intermediate magnetic film is made of GdFeCo, the Gd composition ratio thereof may be set in the range from about 20% to about 28%.

For example, in the magneto-optical recording medium of this example, Tsw1 is set at about 100° C., Tcomp is set at about 240° C. and a GdFeCo film having a Gd composition ratio of about 26.7% and a Fe/Co ratio of about 56% is used as the intermediate magnetic film

EXAMPLE 6

Next, the magneto-optical recording medium in the sixth example of the present invention will be described with reference to FIGS. 10A and 10B.

FIG. 10A is a graph illustrating the temperature dependence of the coercive force in an intermediate magnetic film in the magneto-optical recording medium of this example, while FIG. 10B is a plan view showing a readout beam spot 617 and the vicinity thereof on a track of the magneto-optical recording medium of this example. In FIG. 10A, the axis of the abscissas represents a temperature range from room temperature to a temperature Tsw2 or higher, and the axis of the ordinates represents the coercive force.

The intermediate magnetic film In the magneto-optical recording medium of this example forms an in-plane anisotropic magnetic film in an area 611 in which the temperature is lower than Tsw1 and an area 610 in which the temperature is equal to or higher than Tsw2, and forms a perpendicular magnetic film in an area 612 in which the temperature is equal to or higher than Tsw1 and lower than Tsw2 and in the vicinity of a compensation temperature Tcomp.

When a readout laser beam is irradiated onto the rotating magneto-optical recording medium during the readout of information, the readout beam spot 617 is formed. In this case, the temperature distribution of the magnetic film structure including the readout magnetic film is not in rotation symmetry with respect to the center of a circle formed by the readout beam spot 617, but shifts to the tangential direction of the magneto-optical recording medium. Specifically, as the magneto-optical recording medium moves (or rotates) to the direction indicated by the arrow 616, the area 611 in which the temperature is lower than Tsw1, the area 612 in which the temperature is equal to or higher than Tsw1 and lower than Tsw2, and the area 610 in which the temperature is equal to or higher than Tsw2 exist inside the readout beam spot 617.

As described above with reference to FIGS. 10A and 10B, since the intermediate magnetic film included in the magneto-optical recording medium of this example is an in-plane anisotropic magnetic film in the area 611 having a temperature lower than Tsw1 and in the area 610 having a temperature of Tsw2 or higher, the exchange-coupling force does not act between the recording magnetic film and the readout magnetic film in these areas. Thus, the shrinkage force of the domains 609 in the readout magnetic film becomes stronger than the exchange-coupling force in these areas 611 and 610. As a result, the information recorded as the domains 609 is masked. On the other hand, in the area 612 in which the temperature is equal to or higher than Tsw1 and lower than Tsw2, the intermediate magnetic film has been changed into a perpendicular magnetic film. Thus, in this area 612, a sufficient exchange-coupling force acts to become dominant in the readout magnetic film As a result, in this area 612, the copy of the domains 609 occurs.

It is noted that in order to read out information from the magneto-optical recording medium of this example at a high density, heating needs to be performed so as to obtain an area in which a temperature of the intermediate magnetic film is equal to or higher than the temperature Tsw2 at which the intermediate magnetic film becomes a perpendicular magnetic film upon the irradiation of the readout laser beam.

Moreover, in the intermediate magnetic film included in the magneto-optical recording medium of this example, not only the conditions described in the fifth example but also the relationships Tsw2<Tc1 and Tsw2<Tc3 are required to be satisfied among Tsw2, the Curie temperature Tc1 of the readout magnetic film and the Curie temperature Tc3 of the recording magnetic film, in order to realize the copy of the domains and prevent the domains from being destructed in the temperature area having a temperature equal to or higher than Tsw1 and lower than Tc2.

In order to copy the domains 609 in the area 612 with certainty, the temperature difference between Tsw1 and Tc2 is required to be at least equal to 10° C. Thus, if Tsw1 is 80° C. or higher, it is preferable that Tsw2 is at least equal to 90° C. Furthermore, considering that Tc3 is set in the range from about 180° C. to about 300° C., Tsw1 is preferably set in the range from about 100° C. to about 250° C. and Tsw2 is preferably set in the range from about 110° C. to about 260° C. such that the domains are not destructed. Furthermore, in order to improve the quality of a read out signal, Tsw1 is preferably set at as high a temperature as possible within the above-specified permissible temperature range. In view of these respects, Tsw1 is suitably set in the range from about 130° C. to about 180° C. and Tsw2 is suitably set in the range from about 140° C. to about 190° C.

As a result of the experiments conducted by the present inventors, the component materials satisfying the above-described requirements include GdFeCo, GdFe, GdCo, DyFe and the like. Specifically, in this example, the intermediate magnetic film is made of GdFeCo. The compensation temperature Tcomp is substantially determined by the Gd composition ratio. When the Gd composition ratio is in the range from about 20% to about 28%, the compensation temperature Tcomp is set in the range from about 50° C. to about 280° C. Furthermore, the temperature at which the magnetic film is changed from an in-plane anisotropic magnetic film into a perpendicular magnetic film is determined by the Fe/Co composition ratio. The smaller the Fe composition ratio becomes or the smaller the Fe/Co composition ratio becomes, the higher the temperature at which the film is changed into a perpendicular magnetic film becomes.

For example, in the magneto-optical recording medium of this example, Tsw1 is set at about 130° C., Tsw2 is set at about 160° C., and the intermediate magnetic film is made of $Gd_{23}Fe_{62}Co_{15}$.

In the magneto-optical recording medium of the foregoing examples, ZnS films are used as the protection films 2 and 6. Alternatively, a film made of any other chalcogenide, a film made of an oxide such as $TaO_2$, a film made of a nitride such as SiN, or a film made of a compound of these materials may also be used instead of the ZnS film. Furthermore, a GdFeCo film, a GdFe film and a TbFeCo film are used as the readout magnetic film, the intermediate magnetic film and the recording magnetic film, respectively. Alternatively, a rare earth metal-transition metal containing ferrimagnetic film, a Mn containing magnetic film such as a MnBiAl film or a film made of any other magnetic material may also be used as each magnetic film. Furthermore, a double-face bonded structure using a urethane resin, a hot melt adhesive or the like may also be employed instead of forming the protection layer of an epoxyacrylate resin.

As is apparent from the foregoing description, an external magnetic field (or an initialization magnetic field) ordinarily required for an initialization becomes unnecessary in the magneto-optical recording medium of the present invention. In addition, even when the readout power is varied, the size of the area in a recording magnetic film to which a domain is copied, does not change. Thus, it is possible to prevent the readout characteristics from being degraded owing to the interaction of waveform of the readout signals among the adjacent domains.

Moreover, in the readout method for the magneto-optical recording medium of the present invention, when each magnetic film is heated upon the irradiation of a laser beam during readout, the recording magnetization of a readout magnetic film located in a low temperature area is affected by the surrounding magnetization so as to shrink, so that the magnetized directions of the readout magnetic film are aligned in one direction. As a result, the copy of the domains formed in the recording magnetic film to the readout magnetic film is suppressed and information can be read out only from the domains formed at the locations corresponding to the low temperature area of the recording magnetic film inside a readout laser beam spot. Furthermore, by setting the Curie temperature of the intermediate magnetic film so as to have the function of cutting an exchange-coupling force, the size of the area in which information is read out from the domains can be further limited.

As described above, the present invention can increase the resolution of information recorded on a magneto-optical recording medium during readout and can provide a high-density magneto-optical recording medium Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magneto-optical recording medium comprising at least a readout magnetic film and a recording magnetic film on a substrate, wherein information is recorded onto the recording magnetic film through magnetization of the recording magnetic film thereby forming domains therein, by a heating caused by irradiation of a recording light and application of a recording magnetic field, and the recorded information is read out through irradiation of a readout light thereby copying magnetization of the domains in the recording magnetic film to domains formed in the readout magnetic film, and wherein:

the recording magnetic film is a perpendicular magnetic film in which the formed domains are retained;

the readout magnetic film is a perpendicular magnetic film having a magnetic characteristic in which said domains formed therein shrink; and the readout magnetic film has a unidirectional magnetization and contains no domains formed therein at a timing except for during a readout operation.

2. A magneto-optical recording medium according to claim 1, wherein each of the recording magnetic film and the readout magnetic film is made of a rare earth metal—a transition metal amorphous material.

3. A magneto-optical recording medium according to claim 1, further comprising an intermediate magnetic film, provided between the readout magnetic film and the recording magnetic film, for controlling exchange-coupling force therebetween.

4. A magneto-optical recording medium according to claim 3, wherein the intermediate magnetic film is made of a rare earth metal—a transition metal amorphous material.

5. A magneto-optical recording medium according to claim 3, wherein:

in a temperature area from room temperature Troom to a temperature Tsw1, a force which causes the domains in the readout magnetic film to become extinct is stronger than the exchange-coupling force which works via the intermediate magnetic film; and in a temperature area equal to or higher than the temperature Tsw1, the exchange-coupling force which works via the intermediate magnetic film becomes stronger than the force which causes the domains in the readout magnetic film to become extinct, thereby copying the domains retained in the recording magnetic film to the readout magnetic film via the intermediate magnetic film.

6. A magneto-optical recording medium according to claim 5, wherein a Curie temperature Tc1 of the readout magnetic film, a Curie temperature Tc3 of the recording magnetic film, the temperature Tsw1, and the room temperature Troom satisfy the following relationship: Troom<Tsw1<Tc1 and Troom<Tsw1<Tc3.

7. A magneto-optical recording medium according to claim 5, wherein the intermediate magnetic film is an in-plane anisotropic magnetic film in the temperature area lower than the temperature Tsw1, and a perpendicular magnetic film in the temperature area equal to or higher than the temperature Tsw1.

8. A disc cartridge accommodating therein the magneto-optical recording medium according to claim 5, further comprising a magnet for applying an initializing magnetic field to the magneto-optical recording medium in such a direction that the domains in the readout magnetic film become extinct.

9. A disk cartridge according to claim 8, wherein recorded information is read out by heating the readout magnetic film through irradiation of a readout light to the temperature Tsw1 or higher, thereby copying the domains retained in the recording magnetic film to the readout magnetic film with the exchange-coupling force, and utilizing reflected light from the readout magnetic film.

10. A magneto-optical recording medium according to claim 3, wherein:

in a temperature area from room temperature Troom to a temperature Tsw1, a force which causes the domains in the readout magnetic film to become extinct is stronger than the exchange-coupling force which works via the intermediate magnetic film;

in a temperature area equal to or higher than the temperature Tsw1, the exchange-coupling force which works via the intermediate magnetic film becomes stronger than the force which causes the domains in the readout magnetic film to become extinct;

in a temperature area equal to or higher than a Curie temperature Tc2 of the intermediate magnetic film, magnetization of the intermediate magnetic film become extinct thereby cutting off the exchange-coupling between the recording magnetic film and the readout magnetic film; and the domains retained in the recording magnetic film are copied to the readout magnetic film via the intermediate magnetic film in a temperature area equal to or higher than the temperature Tsw1 and lower than the Curie temperature Tc2.

11. A magneto-optical recording medium according to claim 10, wherein a Curie temperature Tc1 of the readout magnetic film, a Curie temperature Tc3 of the recording magnetic film, the temperature Tc2, the temperature Tsw1, and the room temperature Troom satisfy the following relationship: Troom<Tsw1<Tc2, Tc2<Tc1, and Tc2<Tc3.

12. A magneto-optical recording medium according to claim 10, wherein the intermediate magnetic film is an in-plane anisotropic magnetic film in the temperature area lower than the temperature Tsw1, a perpendicular magnetic film in the temperature area equal to or higher than the temperature Tsw1 and lower than a temperature Tsw2, and an in-plane anisotropic magnetic film in the temperature range equal to or higher than the temperature Tsw2, and wherein a Curie temperature Tc1 of the readout magnetic film, a Curie temperature Tc3 of the recording magnetic film, the temperature Tsw1, the temperature Tsw2, and the room temperature Troom satisfy the following relationships Troom<Tsw1<Tsw2, Tsw2<Tc1, and Tsw2<Tc3.

13. A magneto-optical recording medium according to claim 3, wherein the intermediate magnetic film is made of a non-magnetic material, and in a temperature area from room temperature Troom to a temperature Tsw1, a force which causes the domains in the readout magnetic film to become extinct is stronger than a magneto-static coupling force; and in a temperature area equal to or higher than the temperature Tsw1, the magneto-static coupling force becomes stronger than the force which causes the domains in the readout magnetic film to become extinct, thereby copying the domains retained in the recording magnetic film to the readout magnetic film via the intermediate magnetic film.

14. A magneto-optical recording medium according to claim 13, wherein a Curie temperature Tc1 of the readout magnetic film, a Curie temperature Tc3 of the recording magnetic film, the temperature Tsw1, and the room temperature Troom satisfy the following relationship: Troom<Tsw1<Tc1 and Troom<Tsw1<Tc3.

15. A magneto-optical recording medium according to claim 1, wherein the domains, formed in the readout magnetic film during the readout operation, become extinct at the time except for the readout operation due to a self-shrinkage force of the readout magnetic film.

16. A readout method of a magneto-optical recording medium comprising at least a readout magnetic film, an intermediate magnetic film and a recording magnetic film on a substrate, wherein information is recorded onto the recording magnetic film through magnetization of the recording magnetic film thereby forming domains therein, by a heating caused by irradiation of a recording light and application of a recording magnetic field, and the recorded information is read out through irradiation of a readout light thereby copying magnetization of the domains in the recording magnetic film to the readout magnetic film, and wherein:

the recording magnetic film is a perpendicular magnetic film in which the formed domains are retained;

the intermediate magnetic film controls an exchange-coupling force between the recording magnetic film and the readout magnetic film;

the readout magnetic film is a perpendicular magnetic film;

in a temperature area from room temperature Troom to a temperature Tsw1, a force which causes the domains in the readout magnetic film to become extinct is stronger than the exchange-coupling force which works via the intermediate magnetic film, while in a temperature area equal to or higher than the temperature Tsw1, the exchange-coupling force which works via the intermediate magnetic film becomes stronger than the force which causes the domains in the readout magnetic film to become extinct; and a Curie temperature Tc1 of the readout magnetic film, a Curie temperature Tc3 of the recording magnetic film, the temperature Tsw1, and the room temperature Troom satisfy the following relationship: Troom<Tsw1<Tc1 and Troom <Tsw1<Tc3, the method comprises the step of reading out recorded information by heating the readout magnetic film through irradiation of a readout light to the temperature Tsw1 or higher, thereby copying the domains retained in the recording magnetic film to the readout magnetic film with the exchange-coupling force, and utilizing reflected light from the readout magnetic film; and the method further comprises the step of allowing the readout magnetic film to cool to a temperature less than Tsw1, thereby causing the domains in the readout magnetic film to become extinct.

17. A readout method according to claim 16, further comprising the step of applying an initializing magnetic field to the magneto-optical recording medium in such a direction that the domains in the readout magnetic film become extinct.

18. A readout method of magneto-optical recording medium according to claim 16, wherein the force which causes the domains in the readout magnetic film to become extinct is a self-shrinkage force of the readout magnetic film.

19. A readout method of a magneto-optical recording medium comprising at least a readout magnetic film, an intermediate magnetic film and a recording magnetic film on a substrate, wherein information is recorded onto the recording magnetic film through magnetization of the recording magnetic film thereby forming domains therein, by a heating caused by irradiation of a recording light and application of a recording magnetic field, and the recorded information is read out through irradiation of a readout light thereby copying magnetization of the domains in the recording magnetic film to the readout magnetic film, and wherein:

the recording magnetic film is a perpendicular magnetic film in which the formed domains are retained;

the readout magnetic film is a perpendicular magnetic film;

in a temperature area from room temperature Troom to a temperature Tsw1, a force which causes the domains in the readout magnetic film to become extinct is stronger than the exchange-coupling force which works via the intermediate magnetic film, while in a temperature area equal to or higher than the temperature Tsw1, the exchange-coupling force which works via the intermediate magnetic film becomes stronger than the force which causes the domains in the readout magnetic film to become extinct;

the intermediate magnetic film controls an exchange-coupling force between the recording magnetic film and the readout magnetic film, magnetization of the intermediate magnetic film becoming extinct in a temperature area equal to or higher than its Curie temperature Tc2 to cut off exchange-coupling between the recording magnetic film and the readout magnetic film;

the domains retained in the recording magnetic film are copied to the readout magnetic film via the intermediate magnetic film in a temperature area equal to or higher than the temperature Tsw1 and lower than the Curie temperature Tc2; and a Curie temperature Tc1 of the readout magnetic film, a Curie temperature Tc3 of the recording magnetic film, the temperature Tc2, the temperature Tsw1, and the room temperature Troom satisfy the following relationship: Troom<Tsw1<Tc2, Tc2<Tc1, and Tc2<Tc3, the method comprises the step of reading out recorded information by heating the intermediate magnetic film through irradiation of a readout light to the Curie temperature Tc2 or higher, thereby copying the domains retained in the recording magnetic film to the readout magnetic film with the exchange-coupling force in the temperature range equal to or higher than the temperature Tsw1 and lower than the temperature Tc2, and utilizing reflected light from the readout magnetic film; and the method further comprises the step of allowing the intermediate magnetic film to cool to a temperature less than Tsw1, thereby causing the domains in the readout magnetic film to become extinct.

20. A readout method of a magneto-optical recording medium according to claim 19, wherein the force which causes the domains in the readout magnetic film to become extinct is a self-shrinkage force of the readout magnetic film.

* * * * *